United States Patent [19]

Yamamitsu et al.

[11] 4,400,742
[45] Aug. 23, 1983

[54] MAGNETIC RECORDING AND REPRODUCING APPARATUS FOR COLOR VIDEO SIGNALS

[75] Inventors: Chojuro Yamamitsu, Kawanishi; Ichiro Arimura, Kyoto; Masamitsu Ohtsu, Kadoma, all of Japan

[73] Assignee: Matsushita Electric Industrial Co., Ltd., Osaka, Japan

[21] Appl. No.: 154,454

[22] Filed: May 29, 1980

Related U.S. Application Data

[63] Continuation of Ser. No. 944,388, Sep. 21, 1978, abandoned.

[30] Foreign Application Priority Data

Sep. 26, 1977 [JP] Japan .................... 52-115781

[51] Int. Cl.³ .............................. H04N 5/79
[52] U.S. Cl. .................... 358/318; 358/323; 358/324; 360/27
[58] Field of Search ............ 360/33.1, 37.1, 26, 360/31, 27, 28; 358/147, 21 V, 10, 19, 25, 35, 318, 323, 324, 327, 326, 330

[56] References Cited

U.S. PATENT DOCUMENTS

| | | | |
|---|---|---|---|
| 3,461,226 | 8/1969 | Carnt | 358/323 |
| 3,626,087 | 12/1971 | Tomiska | 358/330 |
| 3,679,816 | 7/1972 | Avins | 358/19 |
| 3,755,617 | 8/1973 | Ichida | 358/19 |
| 3,786,176 | 1/1974 | Narahara | 358/326 |
| 3,812,523 | 5/1974 | Narahara | 358/328 |
| 4,034,397 | 7/1977 | Frost | 358/325 |
| 4,041,526 | 8/1977 | Kaneko | 360/28 |
| 4,121,242 | 10/1978 | Janko | 358/19 |

FOREIGN PATENT DOCUMENTS

| | | | |
|---|---|---|---|
| 50-42733 | 4/1975 | Japan | 358/310 |
| 52-48919 | 4/1977 | Japan | 358/310 |

OTHER PUBLICATIONS

"Network VIR Signals Provide Critical Tests" by Elkins Broadcast Engineering, pp. 32-34, Jan. 1971.

*Primary Examiner*—Alan Faber
*Attorney, Agent, or Firm*—Burgess, Ryan & Wayne

[57] ABSTRACT

A magnetic recording and reproducing apparatus, for recording and reproducing the color television signal including VIR signal, of the type having a comb filter which is inserted in the chrominance signal system and includes a delay line for causing a delay equal to one horizontal line scanning period. In this apparatus the VIR signal has no line correlation so that the output of the comb filter becomes a VIR signal the amplitude of which is reduced by 6dB and that the amplitude and/or phase of the chrominance components of VIR signal are caused to vary over a wide range due to the effects of VIT signal. In order that the stable and correct color images may be reproduced even by a color television receiver of the type in which the amplitude and phase of the chrominance components of VIR signal are detected so as to automatically adjust the color saturation and hue, the amplitude of the chrominance components of VIR signal is detected and corrected in a recording system of a magnetic recording and reproducing apparatus; the burst signal and the chrominance components of VIR signal are compared in phase so as to correct the phase of the carrier color signal with the difference signal before the carrier color signal is recorded; and in the playback mode the chrominance components of VIP signal of the carrier color signal free from time axis distortions are replaced with the stable oscillator output.

4 Claims, 13 Drawing Figures f₀: RECORDED COLOR DIFFERENCE CARRIER FREQUENCY (TROUGH 1)

f_H: HORIZONTAL SCANNING FREQUENCY LEVEL NOT TO SCALE.

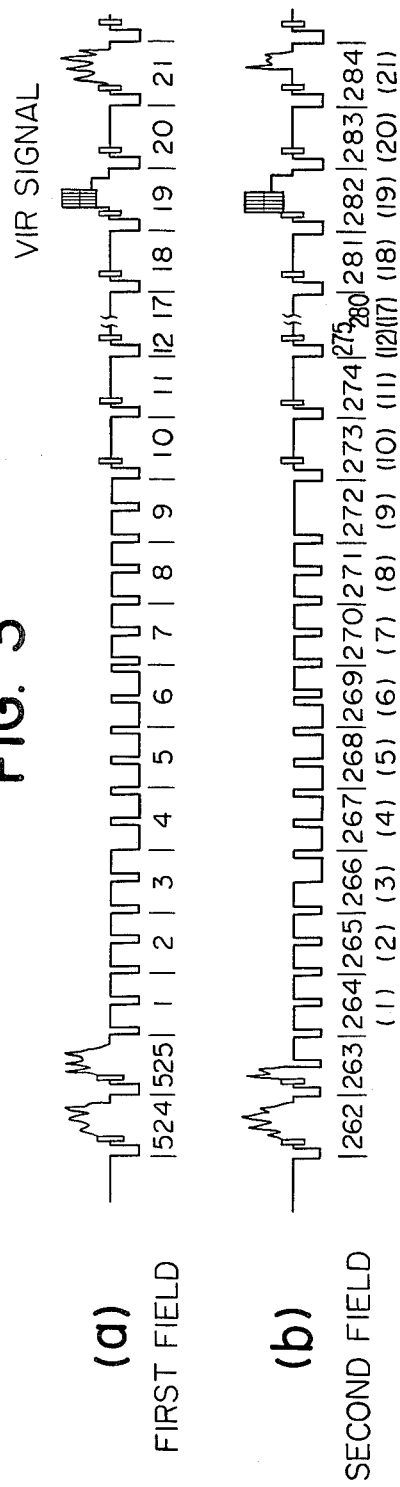
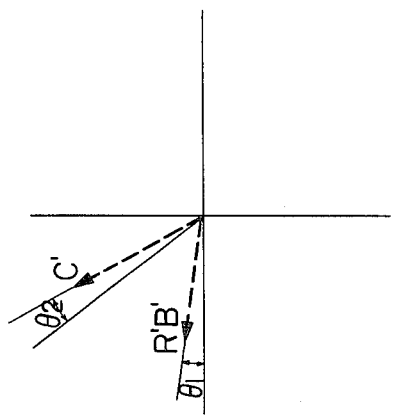
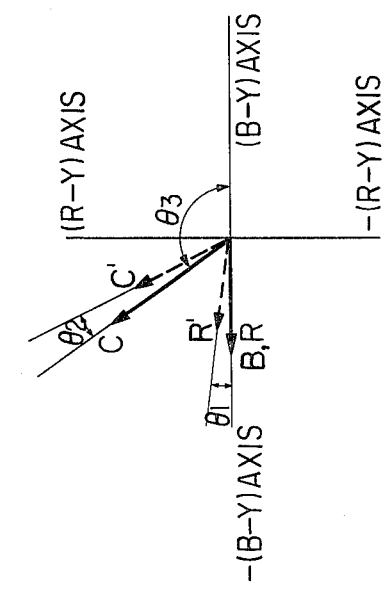

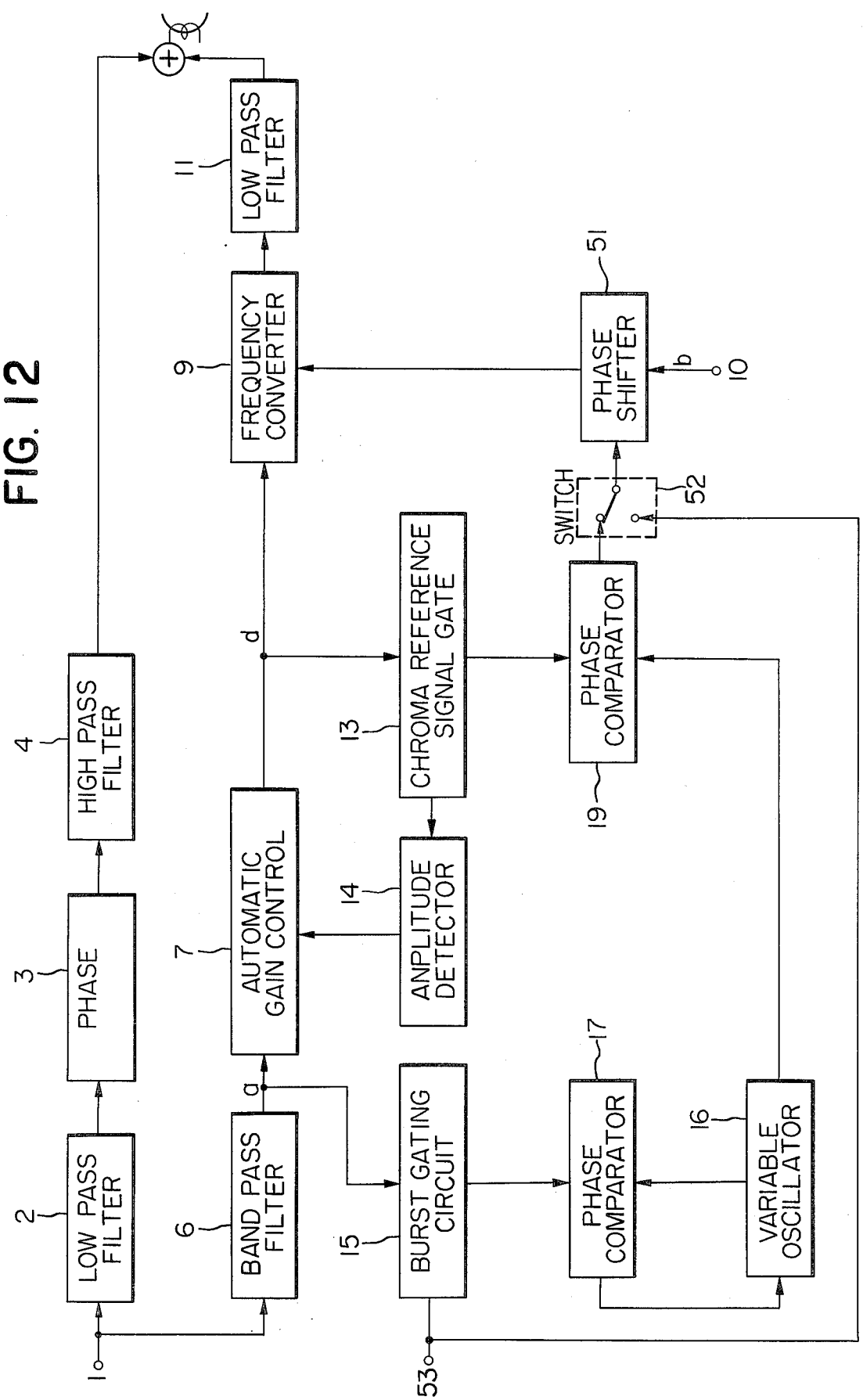

MAGNETIC RECORDING AND REPRODUCING APPARATUS FOR COLOR VIDEO SIGNALS

This is a continuation of application Ser. No. 944,388, filed Sept. 21, 1978, now abandoned.

BACKGROUND OF THE INVENTION

The present invention relates to a magnetic recording and reproducing apparatus for recording and reproducing the color television signal including VIR (Vertical Interval Reference) signal.

In the case of the color television signal transmission in VHF and UHF channels, VIR signal is inserted in the 19-th horizontal scanning cycle or period (according to the FCC standards) of each field as shown in FIG. 1 so that a repeater station may correct transmission distortions in amplitude and/or phase of the color television signal. Recently in the U.S.A. color television receivers have been produced which may control a color saturation and phase of color signal in reference to the VIR signal.

When the color television signal including VIR signal is recorded and reproduced by a video tape recorder, variations in amplitude and phase of VIR signal result because of the reasons to be described below so that the correction of transmission distortions cannot be attained, thus resulting in deviations in saturation and hue.

The distortion problem of VIR signal occurs in the so-called low-frequency conversion and helical scanning type color television signal recording and reproducing apparatus wherein the luminance signal is phase modulated and the carrier color signal is converted into the low-frequency carrier color signal and is superposed on or combined with the phase modulated luminance signal and wherein the guard bands between the adjacent recording tracks are eliminated. Since there exist no guard bands, cross-talk occurs between the adjacent tracks due to tracking errors and is mixed with the signal reproduced from the main track, thus causing interference. In order to minimize cross-talk, the head azimuth angle (for instance ±6°) is varied at the adjacent tracks. Then cross-talk may be reduced by a degree corresponding to the azimuth loss. This is the reason why the azimuth recording system is employed in the guard-band-less type color television signal recording and reproducing apparatus.

In general, the shorter the wavelength, the higher the azimuth loss becomes. For instance, the azimuth loss is high when the luminance signal is phase or frequency modulated, but the azimuth loss is low when the carrier color signal is converted into a low-frequency of the order of hundreds kilohertz because the wavelength becomes longer. In order to eliminate cross-talk between the adjacent tracks (to be referred to as "adjacent cross-talk" for brevity in this specification), there has been proposed a system wherein the carrier color signals are recorded in the adjacent tracks in frequency interlace relationship as shown in FIG. 4 (wherein the frequency spectrum of the carrier color signal recorded in the main track is shown in full line while that of the carrier color signal recorded in the adjacent track in broken lines) and in the playback mode only the main signal is separated from the carrier color signal through a comb filter including a delay line for delaying the carrier color signal for a time equal to one horizontal scanning cycle or period.

Because of the relationship between the delayed and not-delayed carrier color signals, the main signals are added together to cancel cross-talk. However, the chroma reference signal of VIR signal is inserted only in one horizontal scanning cycle or period so that the color carrier signal has no VIR signal in the preceding horizontal scanning cycle or period (although in some cases VIT or test signal is inserted between the 16-th and 18-th horizontal scanning cycles or periods). Therefore the variations in amplitude and/or phase result in comb filter due to the chroma reference signals recorded in the adjacent tracks. As compared with the case where there is no adverse effect due to cross-talk, the amplitude drops by 6 dB.

Furthermore, if VIT signal is inserted in the preceding horizontal scanning cycle or period, it is added to that in the succeeding cycle so that wide variations in amplitude and phase result depending upon the contents of VIT signal. As a result, a color television receiver with VIR control cannot reproduce the correct saturation and hue.

The color television signal recording and reproducing apparatus wherein the recording tracks are spaced apart from each other by guard bands, is provided with a comb filter in order to improve the signal-to-noise ratio (S/N) and eliminate cross-color. Therefore when VIR signal is received, the saturation varies by 6 dB. When VIR and VIT signals are simultaneously received, both the amplitude and phase vary over a wide range so that the correct picture cannot be reproduced.

SUMMARY OF THE INVENTION

The present invention relates to a magnetic recording and reproducing apparatus for recording and reproducing the color television signal containing VIR (Vertical Interval Reference) signal and has for its object to eliminate the variations in color saturation and hue in a color television receiver.

Briefly stated, the present invention provides a magnetic recording and reproducing apparatus wherein in a recording system the distortions in amplitude and phase of the color television signal caused during the transmission from a television broadcasting station to the input of the apparatus are corrected prior to the recording so as to easily eliminate cross-talk from the adjacent tracks as well as the adverse effects of VIT signal in the play backmode; and in the playback mode, the stable oscillator output in phase with the burst signal of the reproduced carrier color signal free from the time axis distortion is inserted as the chrominance components of VIR signal.

BRIEF DESCRIPTION OF THE DRAWINGS

FIG. 3, including a and b, shows the positions of VIR signal inserted in the odd and even fields;

FIG. 5 is a vector diagram used for the explanation of the distortions in amplitude and/or phase;

FIG. 6 is a vector diagram used for the explanation of the correction of distortions in amplitude and/or phase in a recording system of a first embodiment of the present invention;

FIG. 12 is a block diagram of a third embodiment of the present invention; and

DESCRIPTION OF THE PREFERRED EMBODIMENTS

Figure 1:
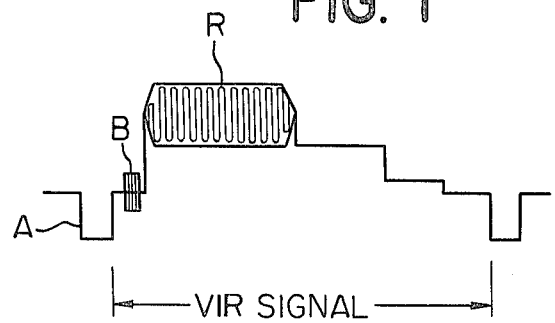
FIG. 1 shows the waveform of VIR signal.

Referring first to FIG. 1, VIR signal consists the burst signal B inserted in the horizontal scanning period, the horizontal sync A, the stepwise luminance signal and the chrominance components (chroma reference signal) R.

Figure 2:
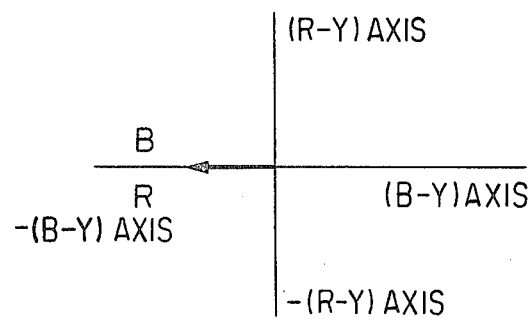
FIG. 2 is a vector diagram of the burst signal and the chroma reference signal.

FIG. 2 shows the vector diagram of the burst signal B and the chroma reference signal R. The chroma reference signal R is in phase with the burst signal and on the (B−Y) axis.

As shown in FIGS. 3(a) and (b), the VIR signals are inserted in the 19-th horizontal scanning period or cycle in each field.

FIG. 5 shows the vectors (in full lines) of the burst signal B, the chroma reference signal R and the carrier color signal C. For the sake of convenience in explanation, they are shown as appearing at the same time. The phase angle with respect to the (B−Y) axis of the carrier color signal C is $\theta_3 + 120°$ and represents flesh tint or tones. These signals in full line are transmitted from a broadcasting station.

It is assumed that because of transmission distortions the magnetic recording and reproducing apparatus receives the signals indicated by broken lines in FIG. 5. That is, the received burst signal B is in phase with the transmitted burst signal, but the received chroma reference signal R' is out of phase by $\theta_1$ relative to the $-(B-Y)$ axis and has an amplitude R'm. The received carrier color signal C' is distorted and is out of phase by $\theta_2$ relative to the transmitted signal C and has an amplitude C'm. The amplitude C'm of the distored carrier color signal C' is given by the following expression:

$$C'm = Cm - \Delta Cm$$

In like manner, $$R'm = Rm - \Delta Rm$$

where

Cm and Rm represent the amplitudes when transmitted;

C'm and R'm represent the amplitude when received; and $\theta_1$ and $\theta_2$ represent the phase angle deviations or shifts of the chroma reference signal and the carrier color signal, respectively.

As shown in FIG. 1, the chroma reference signal is transmitted at a high luminance level (70%) so that transmission distortions most likely occurs. Flesh tint is also at a high level (more than 10%). Therefore $\theta_2 \simeq \theta_1$ and $Cm/Rm \simeq C'm/R'm$. It can be seen from FIG. 5 that the phase distortion or shift $\theta_2$ of the carrier color signal C is almost equal to $\theta_1$ of the chroma reference signal R. When the amplitude of chroma reference signal R varies by $\Delta Rm$, the amplitude of carrier color signal also varies by $\Delta Cm$. It is the signals indicated by broken lines in FIG. 5 (and the luminance signal) that are fed to the color television signal recording and reproducing apparatus or the video tape recorder.

Figure 7:
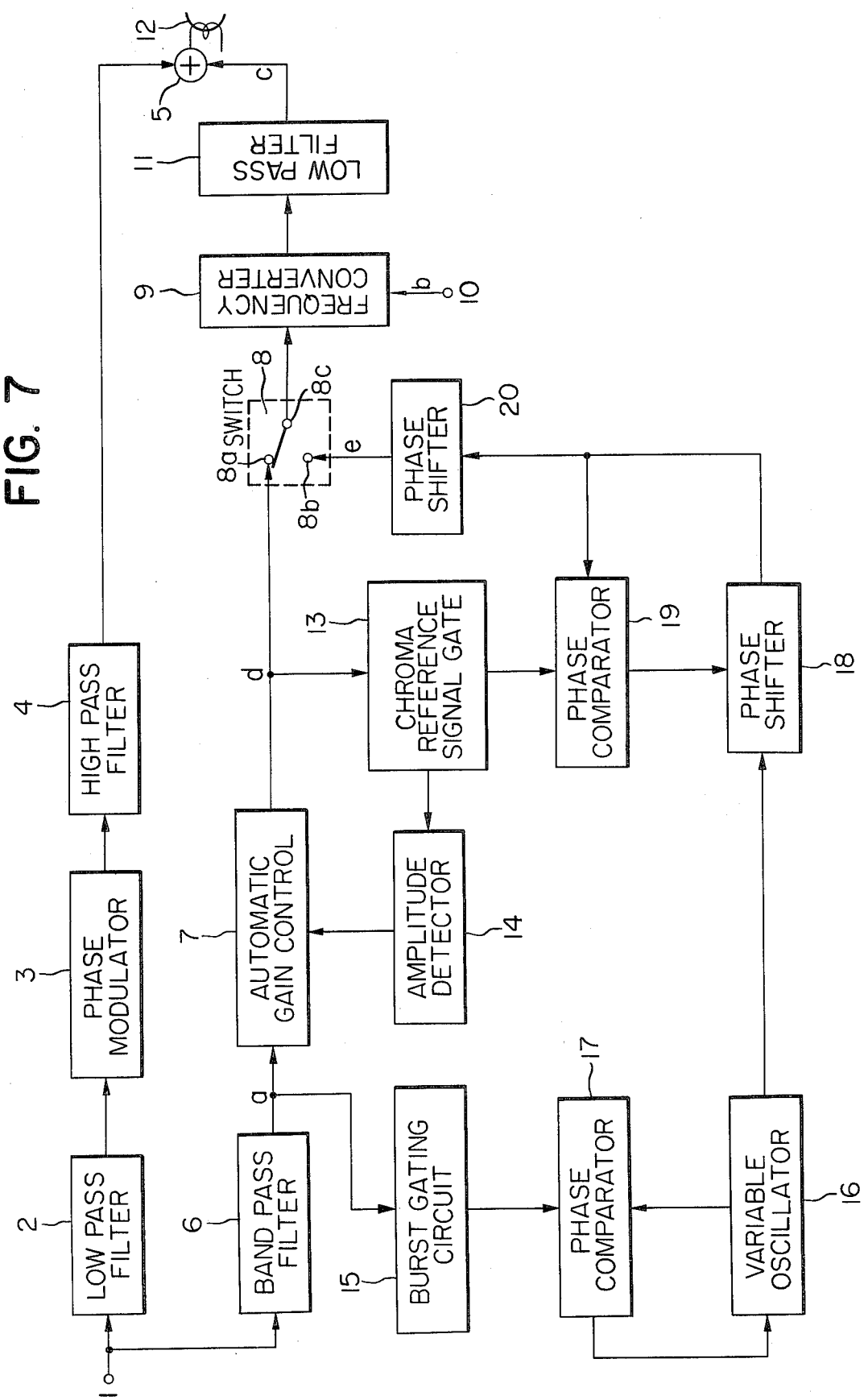
FIG. 7 is a block diagram of a recording system of the first embodiment.
Figure 8:
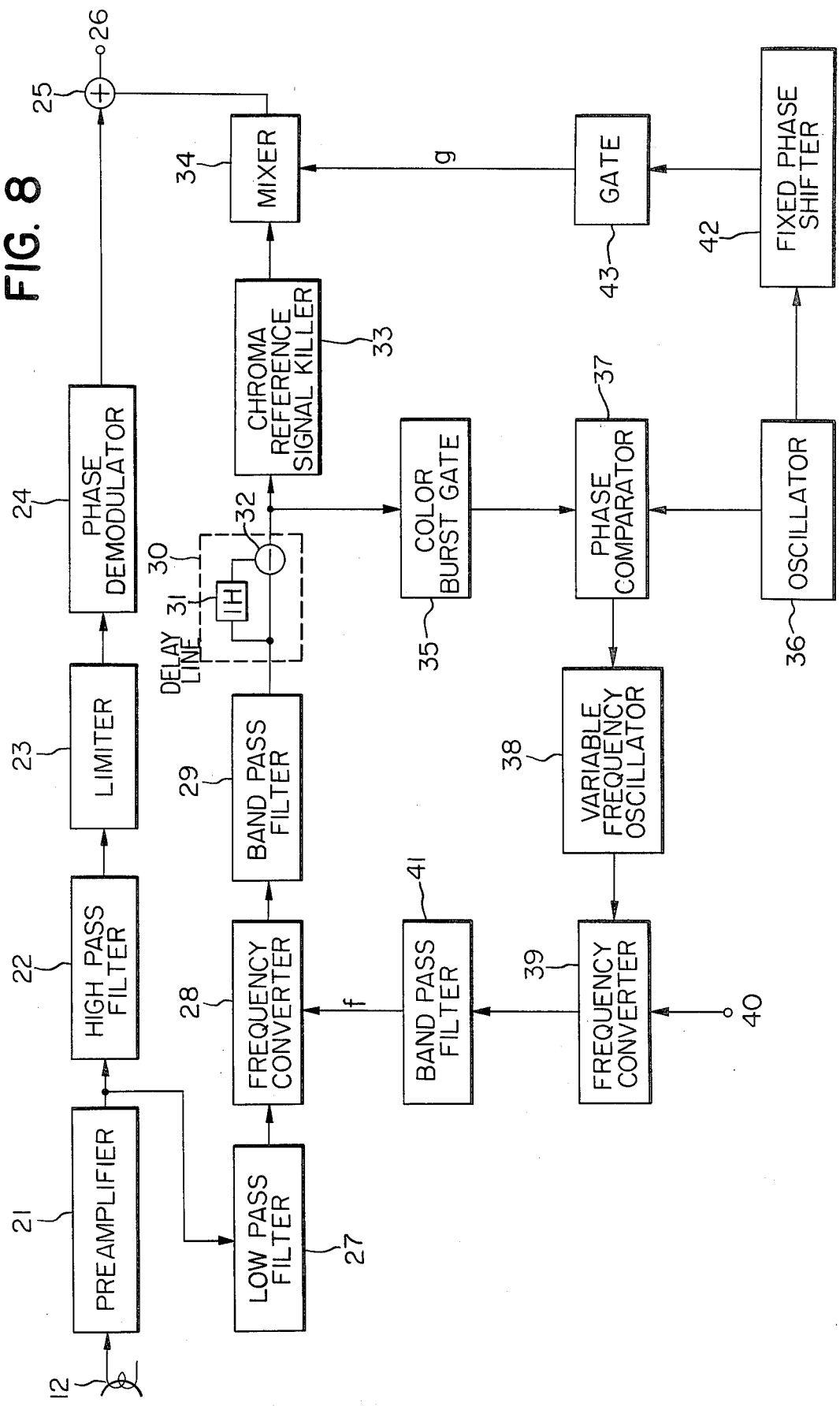
FIG. 8 is a block diagram of a reproducing system thereof.
Figure 9:
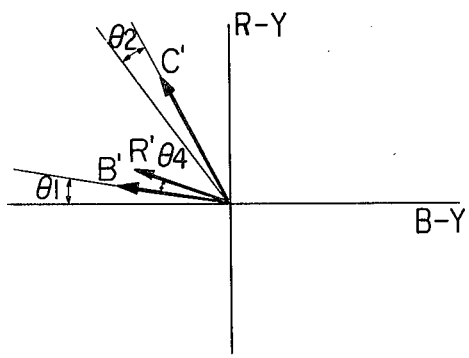
FIG. 9 is a view used for the explanation of the mode of operation thereof.

First Embodiment, FIGS. 7–9

Referring to FIG. 7, the color television signal which is distorted as described above is applied to a color or video signal input terminal 1. The luminance signal is derived from a low pass filter 2 and is frequency modulated in a phase modulator (for instance, FM modulator) 3. After the low frequency components have been removed in a high pass filter 4, the output from the phase modulator 3 is applied to a mixer 5. The carrier color signal a including VIR signal or VIT signal and the chroma reference signal of VIR signal is derived from a band pass filter 6 and is applied to an automatic gain control 7 so that the carrier color signal to be applied to a contact 8a of a switch 8 may be maintained at a constant level.

The automatic gain control 7 is controlled by a DC voltage obtained by separating the chroma reference signal (R signal) of VIR signal in the 19-th horizontal scanning cycle of each field through a chroma reference signal gate 13 and by amplitude detecting the separated R signal. That is, in response to $R'm = Rm - \Delta Rm$ and $C'm = Cm - \Delta Cm$, the automatic gain control 7 controls variants $-\Delta Rm$ and $-\Delta Cm$ so that the constant Rm and Cm may be obtained and consequently the chroma reference signal may have a constant level Rm as shown in FIG. 6.

The burst signal derived from a burst gating circuit 15 is compared in phase with the output from a variable oscillator 16 of a center frequency of 3.58 MHz in a phase comparator 17 and in response to the error or difference signal from the comparator 17, the oscillator 16 is controlled. This system is called APC circuit. Alternatively, a ringing oscillator may be used.

The continuous wave in phase with the burst signal is derived and applied to a phase shifter 18 (which may consist of, for instance, a pulse modulator or a variable delay line). The output from the phase shifter 18 is applied to a phase comparator 19 and a phase shifter 20. The phase comparator 19 compares the chroma reference signal (R' in FIG. 5) derived from the chroma reference signal gate 13 with the output from the phase shifter 18. The difference or error signal from the comparator 19 in turn controls the phase shifter 18. The output from the phase shifter 18 is in phase with the chroma reference signal of VIR signal and is further shifted in phase by the 90° phase shifter 20 so as to be in phase with the chroma reference signal. The output from the phase shifter 20 is applied to a contact 8b of the switch 8. The chroma reference signal applied to the contact 8a and the continuous wave e applied to the contact 8b are in phase with R' and B' in FIG. 6. (It is assumed that these two signals appear at the same time.) The chroma reference signal (R' in FIG. 6) in the signal d is made equal in level to the continuous wave e. The contact 8a is normally kept in electrical contact with the contact 8c and only when the burst signal is received, the contact 8b is made into contact with the contact 8c so as to insert the continuous wave e. When the chroma reference signal R', the burst signal B' and the carrier color signal C' shown in FIG. 6 are detected with the continuous wave in phase with the burst signal B', the detected phase and amplitude of carrier color signal C' are identical with those transmitted. In other words, transmission distortions are corrected.

The carrier color signal thus obtained from the contact 8c of the switch 8 is frequency converted by the frequency converter 9 with the continuous wave b applied to a continuous wave input terminal 10, and the output from the frequency converter 9 is applied to a low pass filter 11 to attenuate the low-frequency components. The output from the low pass filter 11 is applied to the mixer and combined with the FM luminance signal. The combined signal is applied to a video head 12 and recorded on a tape. The low-frequency converted carrier color signal c has a frequency of hundreds kilo hertz. In the case of the guard-band-less azimuth recording described elsewhere, the continuous wave b is advanced in phase by 90° for each line in one track while in another track it is delayed by 90° for each line, whereby the frequency interlace is accomplished. The frequency interlace is disclosed in detail in Japanese Laid-Open Nos. 48919/1977 and 42733/1975.

Figure 4:
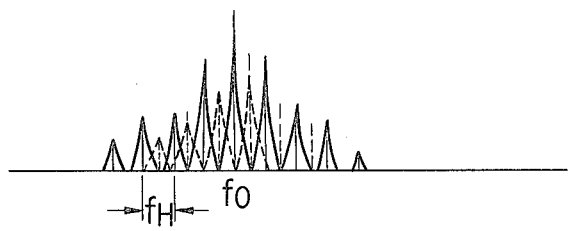
FIG. 4 shows the frequency spectra of the carrier color signal recorded in the adjacent tracks.

Advancing the phase of the continuous wave b by 90° for each line is advancing the phase of the low-frequency converted carrier color signal in the low pass filter 11 by 90° for each line. In like manner, lagging the phase of the continuous wave b by 90° for each line is lagging the phase of the low-frequency converted carrier color signal in the low pass filter 11 by 90° for each line. Referring to FIG. 4, assume that the low-frequency converted subcarrier frequency $fc = 40 f_H$ when there is no phase shift. When the phase is advanced by 90° for each line, the center energy is shifted to $fc + f_H/4$, but when the phase is lagged by 90° for each line, the center energy is shifted to $fc - f_H/4$ as will be described in detail hereinafter.

Let $fc - f_H/4 = f_0$. When the signal is lagged by 90° for each line, the color subcarrier frequency's spectrum has the center energy at $f_0$ and the components thereof are spaced apart from each other by $f_H$ (the horizontal scanning frequency) on both sides of $f_0$. When the phase is advanced by 90°, the center energy exists at $f_0 + f_H/2$ and the components are also spaced apart from each other by $f_H$. Therefore the recording tracks have a frequency difference of $f_H/2$. Thus the frequency interlace results so that in the case of reproducing, cross-talk between the adjacent track may be eliminated in the comb filter.

Referring to FIG. 8, the signal free from transmission distortions as described above is reproduced from the tape through the video head 12 and amplified by a preamplifier 21. Only FM luminance signal derived through a high pass filter 22 is applied to a limiter 23 so as to remove the amplitude variations. The output from the limiter 23 is frequency demodulated in a phase demodulator 24 into the luminance signal, which in turn is applied to a mixer 25.

The low-frequency carrier color signal derived from a low pass filter 27 is frequency converted with a continuous wave f in a frequency converter 28 and band pass filter 29 so that the carrier color signal of 3.58 MHz (fs) identical to the transmitted signal is reproduced. Thus reproduced carrier color signal is applied to a comb filter 30 in which the signal delayed by a delay line 31 by a time equal to one horizontal scanning cycle is subtracted from a not-delayed signal in a subtractor 32, whereby cross-talk may be eliminated. The output from the comb filter 30 is applied to a chroma reference signal killer 33 to eliminate the chroma reference signal of VIR signal in carrier color signal. The elimination period is equal to the R signal cycle or the 19-th horizontal scanning cycle or period. The carrier color signal excluding the chroma reference signal is applied to the mixer 34 and added to the continuous wave g which is in phase with the burst signal and is gated in for a period equal to the chroma reference signal cycle in the 19-th horizontal scanning cycle. The output from the mixer 34 is applied to the mixer 25 and combined with the luminance signal so that the color or video signal for reproduction is derived from an output terminal 26.

The time-axis distortions of the carrier color signal must be also eliminated. To this end the output from the filter 30 is applied to the color burst gate 35. The burst signal derived from the gate 35 is compared in phase in a phase comparator 37 with the output from an oscillator 36 of 3.58 MHz. In response to the phase difference or error signal from the comparator 37, the variable oscillator 38 is controlled. The continuous wave which is derived from an output terminal 40 of AFC is in phase with the time-axis distortion of the horizontal sync. This continuous wave and the output from the variable frequency oscillator 38 are frequency converted in a frequency converter 39 and a band pass filter 41 so that the continuous wave f of (fs + fc) may be obtained. This continuous wave f is the signal that has time-axis distortion equal to that of the low-frequency converted carrier color signal. The difference or distortion components are removed in the frequency converter 28 so that the stable carrier color signal free from the time-axis distortions may be derived.

Since the low-frequency carrier color signal is shifted in phase in the case of recording, the continuous wave f must be shifted by +90° for each line in one track and by −90° for each line in another track.

FIG. 9 is a vector diagram of the carrier color signal h free from time-axis distortions and cross-talk. The burst signal B' and the carrier color signal C' have line corelation. The comb filter 30 eliminates cross-talk so that the vector diagram in FIG. 9 is substantially similar to the vector diagram shown in FIG. 6. However, it should be noted that the chroma reference signal has no line corelation so that it is shifted by $\theta_4$ relative to the burst signal due to cross-talk and the chrominance components of VIT signal. Both the phase and amplitude of chroma reference signal vary over a wide range. Therefore the reproduced chroma reference signal R' shown in FIG. 9 must be eliminated by the circuit 33. Instead of the eliminated chroma reference signal, the continuous wave having the same amplitude and phase with those of the burst signal B' (FIG. 9) is derived as the chroma reference signal so that the signal as shown in FIG. 6 may be reproduced. The vector diagram shown in FIG. 6 is equivalent to the vector diagram shown in full line in FIG. 5. That is, the signal correctly identical with that transmitted from a broadcasting station may be reproduced.

When the chroma reference signal is generated, the output from the 3.58 MHz oscillator 38 is controlled in phase by a fixed phase shifter 42 so as to be in phase with the burst signal in the carrier color signal h. The phase-controlled output is applied to the gate 43 so that the continuous wave g may be derived and mixed only for a cycle corresponding to the chroma reference signal cycle in the 19-th horizontal scanning cycle or period. In this case, the amplitude of the signal g is made substantially equal to that of the signal h. When a prior art comb filter is used, the chroma reference signal varies in amplitude and phase due to cross-talk and the chroma reference signal of VIT signal so that no satisfactory picture can be reproduced when the saturation and hue of a color television receiver are controlled by VIR control signal. However, according to the present invention the correct picture may be reproduced. Furthermore transmission distortions are corrected with the chrominance components or chroma reference signal of VIR signal in the case of recording so that the clear picture may be reproduced even with a conventional color television receiver.

In the first embodiment, the continuous wave which is made in phase with the burst signal is further made in phase with the chroma reference signal by the variable phase shifter 18 as shown in FIG. 6, but it will be understood that the carrier signal excluding the burst signal may be made in phase with the burst signal.

In the first embodiment, the continuous wave in phase with the burst signal is first derived from the switch 8 so as to correct transmission distortions and then the low-frequency carrier color signal is derived which is frequency converted with the continuous wave b. But it will be understood that the distortion-free low-frequency carrier color signal may be derived by shifting the phase of the carrier color signal excluding the burst signal with the continuous wave b. In this case, the burst signal and the chroma reference signal are compared in phase and in response to the phase difference or error signal the phase of the continuous wave b may be controlled. Thereafter, in order to make the amplitude of chroma reference signal of the carrier color signal, which is made constant in the gain control circuit 7, equal to the amplitude of the burst signal, the amplitude of the burst signal is varied in the main loop consisting of the band pass filter 6, the automatic gain control 7, the converter 9 and the low pass filter 11.

In the playback mode, instead of the output from the oscillator 36, the output from the variable frequency oscillator 38 may be applied to the shifter 42 so that the continuous wave g in phase with the burst signal may be derived.

More specifically, referring to FIG. 12, the continuous wave (the output of the oscillator 16 in FIG. 7) in phase with the color burst signal and the chroma reference signal (the output of the gate 13 in FIG. 7) are compared in phase in the phase comparator 19. The difference or error signal from the phase comparator 19 is applied to a phase shifter 51 through a switch or an error signal interruption circuit 52 for interrupting the error signal during the burst cycle. In the phase shifter the error signal controls the continuous wave b applied at the terminal 10, thereby attaining the equivalent phase shift of the carrier color signal.

So far the transmission distortions have been described as being corrected regardless of the level of the luminance signal, but in practice transmission distortions such as differential phase (DP) and differential gain (DG) vary depending upon the level of the luminance signal. Therefore, in order to strictly compensate for transmission distortions depending upon the level of the luminance signal, it is preferable to vary the compensation depending not only upon the difference in phase between the burst and chroma reference signals but also upon the level of the luminance signal as will be described in detail hereinafter.

Figure 10:
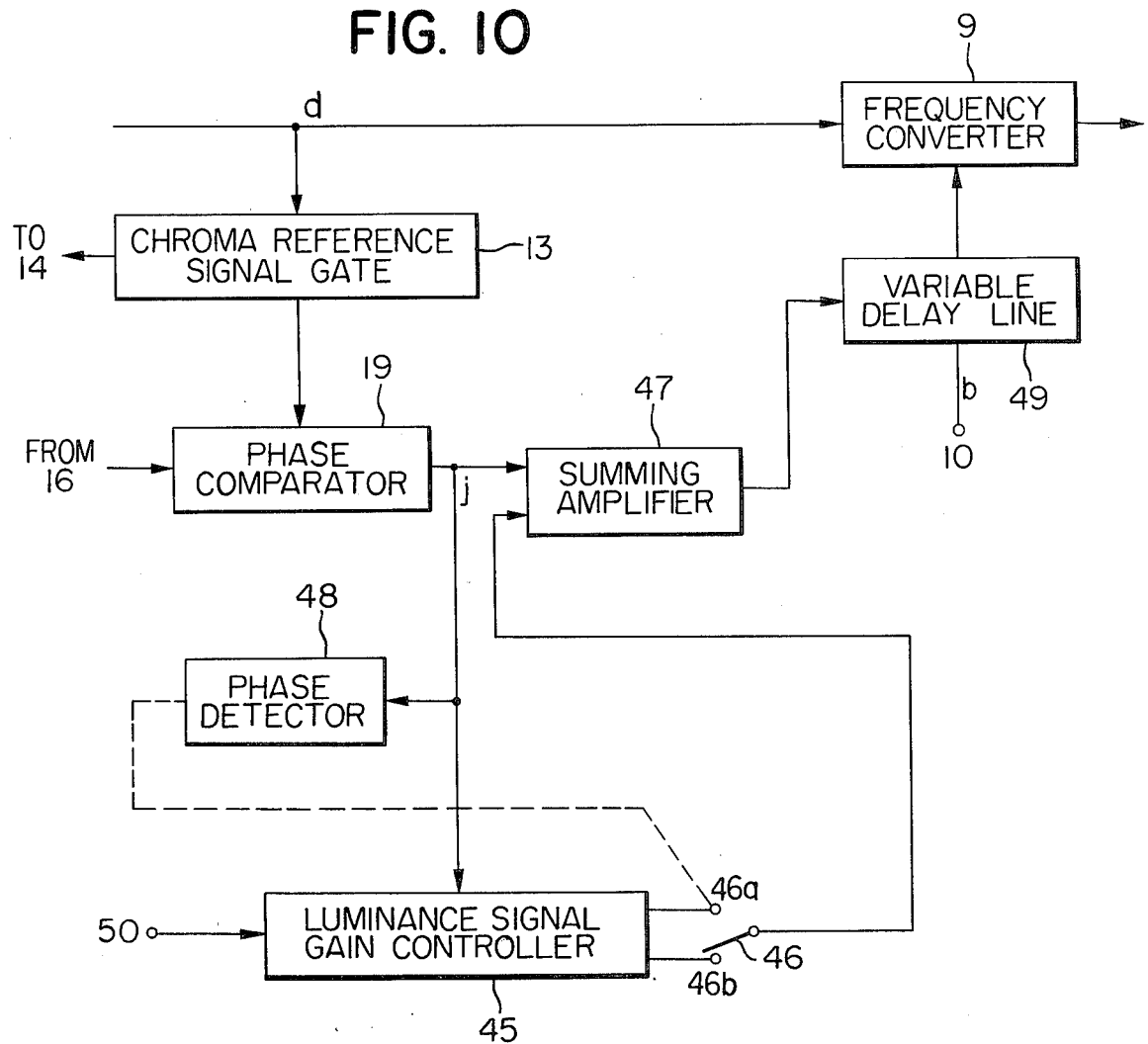
FIG. 10 is a fragmentary block diagram of a second embodiment of the present invention.
Figure 11:
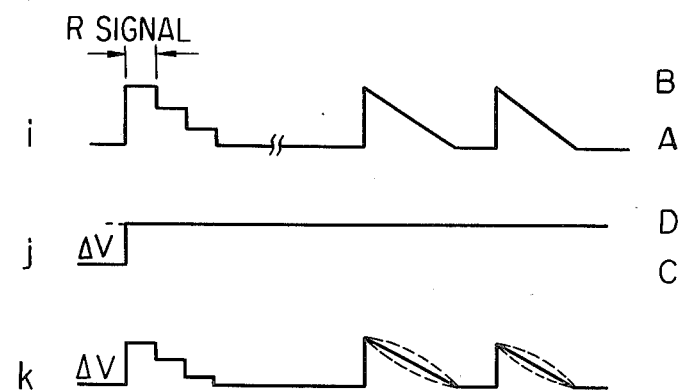
FIG. 11 shows waveforms used for the explanation of the mode of operation of the second embodiment.

Second Embodiment, FIGS. 10 and 11

The phase comparator 19 compares the chroma reference signal (the output from the chroma reference signal gate 13 in FIG. 7) with the continuous wave (the output from the oscillator 16 in FIG. 7) in phase with the burst signal and generates the error signal which in turn is applied to a summing amplifier 47 and to a luminance signal gain controller 45 so as to control the luminance signal applied to an input terminal 50. Therefore when the error signal is greater (or smaller), the output from the luminance signal gain control 45 is higher (or lower) accordingly. The gain control produces two outputs, one in phase with the input appearing at an output 46a and the other inverted in phase at an output 46b. In response to the pulse signal from a phase detector 48 which detects whether or not the error or difference signal from the phase comparator 19 is advanced relative to a reference phase, a switching circuit 46 closes the contact 46a or 46b. The output from the switching circuit 46 is applied to the summing amplifier 47 which adds the outputs from the phase comparator 19 and the switching circuit 46 which are weighted at a suitable ratio. In response to the output from the summing amplifier 47 the phase of the continuous wave b applied to the input terminal 10 is shifted by a phase modulator or a variable delay line as will be described in more detail with reference to FIG. 11.

FIG. 11(i) shows the luminance signal at the terminal 50 and above a certain pedestal. FIG. 11(j) shows the error or difference signal. C denotes a reference level in phase with the burst signal. The error or difference signal voltage ΔV is generated at the position of R signal, sampled and held. The waves shown in FIGS. 11(i) and (j) are mixed at a suitable ratio in the summing amplifier 47 so that the output k in FIG. 11 from the summing amplifier 47 may become ΔV during the R signal cycle. This means that the luminance level between the pedestal and R signal is proportionally phase controlled. Alternatively in response to transmission distortions some gamma correction may be made as indicated by broken lines. When the error signal from the phase comparator 19 is lower than the level C (that is, when the error signal lags behind the chroma reference signal), the output of inverted polarity is derived from the luminance signal gain control 45 and is added to the error signal in the summing amplifier 47. The output of the summing amplifier 47 controls a variable delay line 49.

In the second embodiment shown in FIG. 10, the continuous wave b is varied in phase by the variable delay line 49 so that the carrier color signal may be varied in phase. However, it will be understood that the carrier color signal itself may be varied in phase. In this case, in order to correct transmission distortions, the difference in level between the burst signal and chroma reference signal is derived so as to vary in amplitude and polarity of the luminance signal. The luminance signal is then mixed with the difference signal into a control signal which in turn controls the gain of the carrier color signal.

In the second embodiment, the continuous wave b is shifted in phase so as to shift the phase of the carrier color signal. In this case, as with the third embodiment shown in FIG. 12, the phase shift control must be suspended during the burst signal cycle. Furthermore, the objects of the present invention may be attained by shifting in phase the continuous wave, which is derived from the oscillator 16 in FIG. 7 and is in phase with the burst signal, instead of the continuous wave b and inserting the phase-shifted continuous wave into the carrier color signal instead of the burst signal.

As described above, the amplitude distortions, regardless of their magnitudes with respect to the reference (the amplitude Rm of R in FIG. 1), may be so controlled by the automatic gain control 7 (See FIG. 7) as to become equal to the reference value. In this case, the conventional automatic gain control operating on the burst signal may be used as will be described in detail below.

Figure 13:
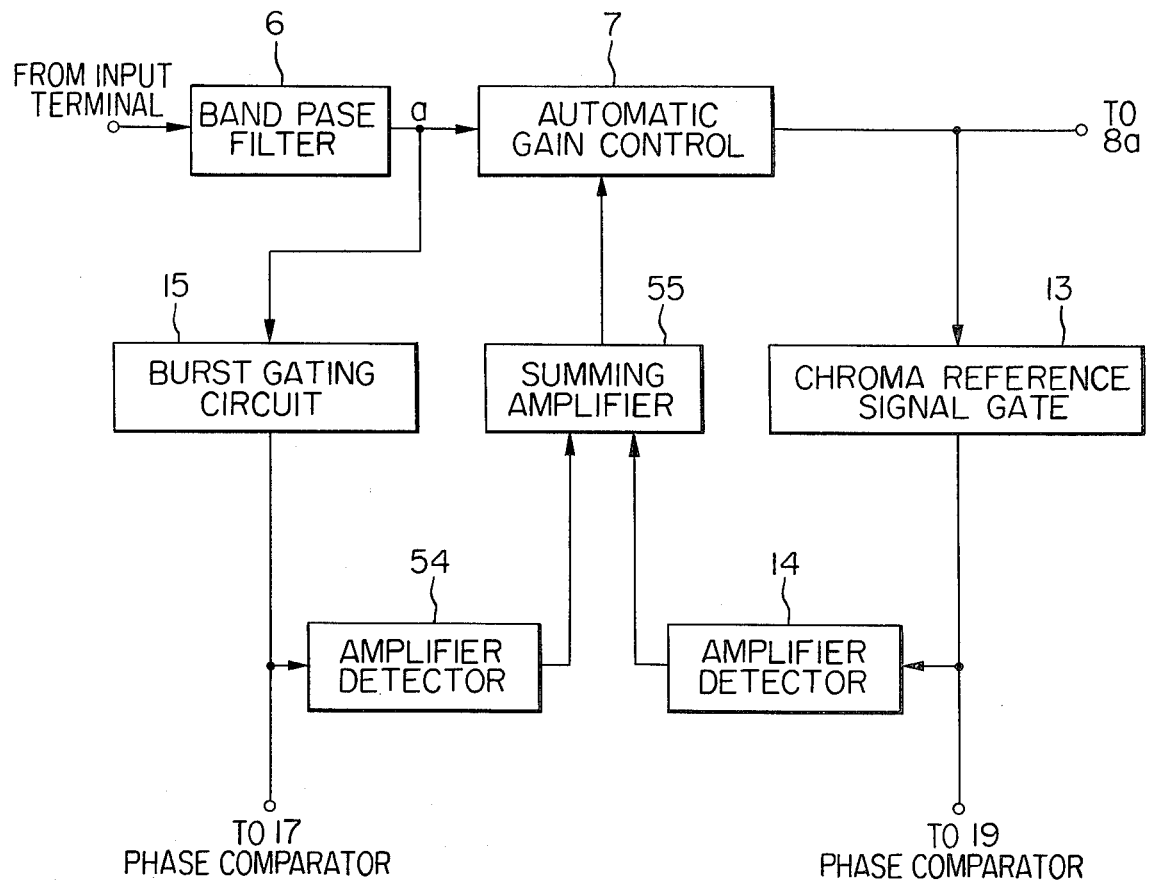
FIG. 13 is a block diagram of a fourth embodiment of the present invention.

Fourth Embodiment, FIG. 13

Referring to FIG. 13, the burst signal is separated from the carrier color signal a in the burst gate 15 and applied to an amplitude detector 54. The DC voltage derived from the amplitude detector 54 is applied to a summing amplifier 55 the output of which in turn controls the amplitude of the automatic gain control 7.

The output of the automatic gain control 7 is applied to the gate circuit 13 so as to separate the chroma reference signal of VIR signal and apply it to the amplitude detector 14. The DC output voltage of the amplitude detector 14 is applied to the summing amplifier 55 and added to the DC voltage from the amplitude detector 54 so as to control the amplitude of the automatic gain control 7.

The feature of the fourth embodiment comprises therefore open loop means for controlling the gain in response to the color burst signal and closed loop means for controlling the gain in response to the chroma reference signal of VIR signal. Thus the automatic gain control 7 is used in common. The advantage of the fourth embodiment is that in the open loop means the gain is controlled with a relatively fast time constant so as to maintain the amplitude of the carrier color signal constant and then the correction of amplitude is made in response to the chroma reference signal at a relatively slow time constant so that the stable correction of amplitude distortions may be ensured.

So far the present invention has been described in connection with the low-frequency conversion type magnetic recording and reproducing apparatus and the low-frequency conversion and frequency interlace type magnetic recording and reproducing apparatus, but it is to be understood that the present invention may be equally applied to any magnetic recording and reproducing systems incorporating a comb filter.

In summary, according to the present invention in the case of recording the transmission distortions are corrected so that the problem of the decrease in the signal-to-noise ratio due to the variations in output amplitude and consequently the transmission distortions may be corrected in a stable manner. Furthermore the stable color images with correct amplitude and/or phase may be reproduced by a color television signal with VIR control by the substitution of the chroma reference signal of VIR signal with the stable oscillator output.

What is claimed is:

1. A magnetic recording and reproducing apparatus for recording and reproducing a color television signal containing a VIR signal, comprising:
   means for separating the color burst signal component and the normal chroma reference signal to be recorded;
   means for correcting any transmission distortions in amplitude and/or phase of the carrier color signal portion of said color television signal having said VIR signal components separated therefrom, to provide a corrected color television signal;
   means for recording said corrected color television signal;
   means for reproducing said recorded color television signal, the reproduced signal including an abnormal chroma reference signal component; and
   means operatively associated with said reproducing means for providing the reproduced color television signal with a corrected chroma reference signal comprising the color burst signal constituent of the carrier color signal portion of said reproduced color television signal by substituting the normal chroma reference signal component for the abnormal chroma reference signal component of said reproduced color television signal.

2. A magnetic recording and reproducing apparatus for recording and reproducing a color television signal containing a luminance signal, a color signal, and a VIR signal in which as a result of transmission distortion an abnormal VIR signal is reproduced when the recorded color television signal is reproduced, said apparatus comprising:
   means for separating the luminance signal and the color signal from the color television signal;
   means for obtaining a low band converted color signal by frequency-converting the color signal to a low frequency band by using a conversion signal;
   means for separating the color burst signal component and the chroma reference signal component of the VIR signal from said color signal;
   means for generating a control signal corresponding to the extent of phase distortion of the color signal detected by using the color burst signal and the chroma reference signal components; and
   means for indirectly correcting the transmission distortion of the phase of the low band converted color signal comprising a phase shifter for changing the phase of the conversion signal in accordance with the value of said control signal, and means for coupling said control signal to said phase shifter only at times when said color burst signal component is absent from said color signal of said color television signal.

3. A magnetic recording and reproducing apparatus for recording and reproducing a color television signal containing a VIR signal, comprising:
   means for separating the color burst signal component and the normal chroma reference signal to be recorded;
   means for correcting any transmission distortions in amplitude and/or phase of the carrier color signal portion of said color television signal having said VIR signal components separated therefrom, to provide a corrected color television signal,
   said transmission distortion correcting means including:
   amplitude control means for adjusting the amplitude of the color signal to bring the amplitude of the chroma reference signal comprised in the color signal to a predetermined level,
   means for generating a continuous wave signal having the same phase and amplitude as those of the chroma reference signal comprised in the adjusted color signal from said amplitude control means, and means operative only during the color burst period for similarly correcting the transmission distortions of the color signal by substituting the continuous wave signal for the color burst signal comprised in the color signal from the amplitude control means;

means for recording said corrected color television signal;

means for reproducing said recorded color television signal, the reproduced signal including an abnormal chroma reference signal component; and means operatively associated with said reproducing means for providing the reproduced color television signal with a corrected chroma reference signal comprising the color burst signal constituent of the carrier color signal portion of said reproduced color television signal by substituting the normal chroma reference signal component for the abnormal chroma reference signal component of said reproduced color television signal.

4. A magnetic color TV signal recording and reproducing apparatus in which the normal VIR signal included in a color television signal is not reproduced, comprising:

first means operative in the recording mode for separating from the color television signal including the VIR signal, the color burst signal and the chroma reference signal components of the VIR signal;

second means operative in the recording mode for utilizing said color burst signal and said chroma reference signal components to eliminate transmission amplitude distortions in said color TV signal by generating a continuous wave (16) synchronized in phase with said color burst signal, comparing the phase of said continuous wave with that of said chroma reference signal, said generating in response to the resulting phase difference signal, a continuous wave signal (18, 51) synchronized in phase with said chroma reference signal;

third means responsive to the continuous wave signal (18, 51) derived from said secnd means for phase shifting the color burst signal and a carrier color signal derived from said color TV signal with respect to each other, and for recording the phase shifted signals on a record medium, thereby effecting recording after the transmission amplitude and phase distortions have been compensated for;

fourth means adapted to be coupled to said record medium for obtaining a normal chroma reference signal in synchronism with a reproduced color burst signal corresponding to said color TV signal in the reproduction mode; and fifth means responsive to said fourth means for replacing an abnormal chroma reference signal component of the VIR signal with said normal chroma reference signal derived from said fourth means in the reproduction mode.

* * * * *